Sept. 16, 1952     K. A. KNUTSEN     2,610,736
MACHINE FOR COMPARING AND CLASSIFYING RECORD CARDS
Filed Dec. 17, 1946     7 Sheets-Sheet 1
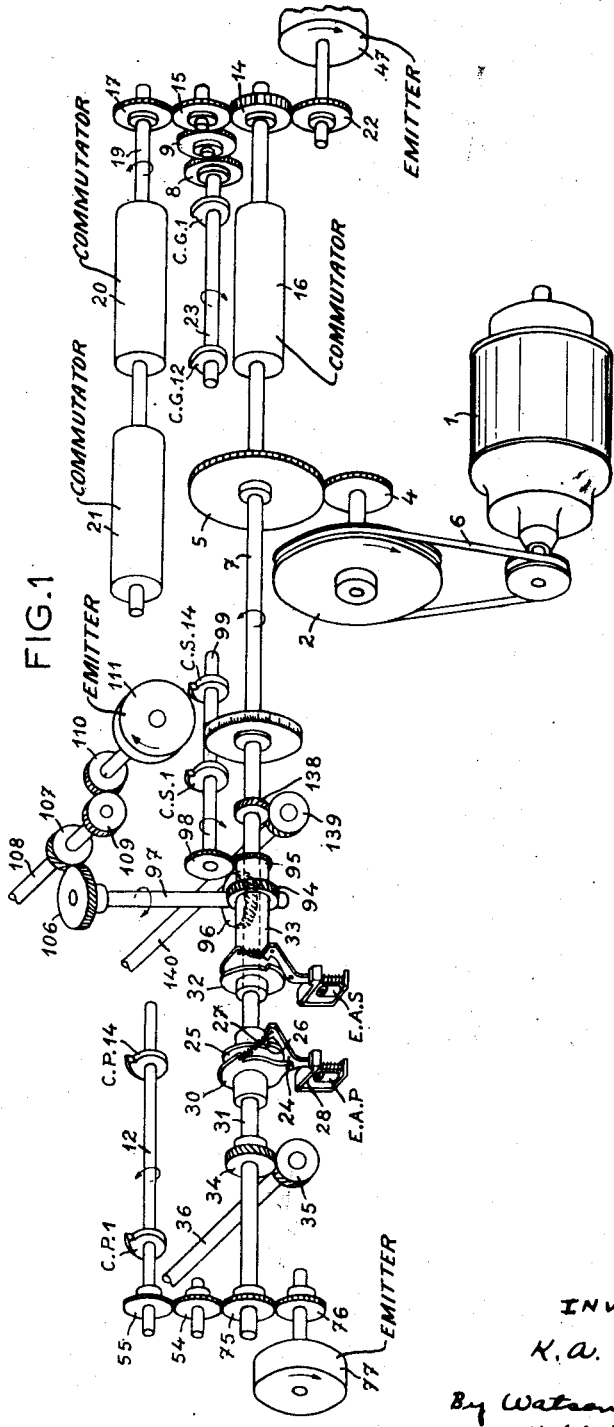
INVENTOR
K. A. Knutsen
By Watson, Cole, Grindle & Watson

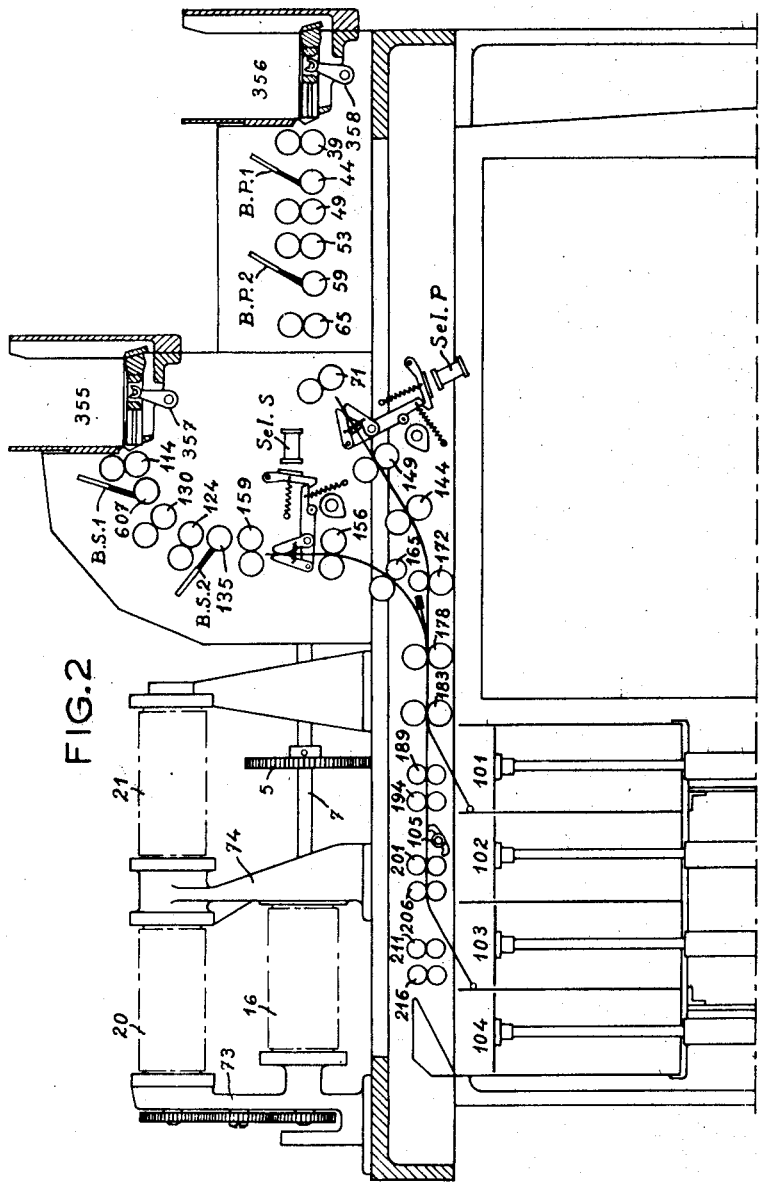

Sept. 16, 1952        K. A. KNUTSEN        2,610,736
MACHINE FOR COMPARING AND CLASSIFYING RECORD CARDS
Filed Dec. 17, 1946                      7 Sheets-Sheet 3
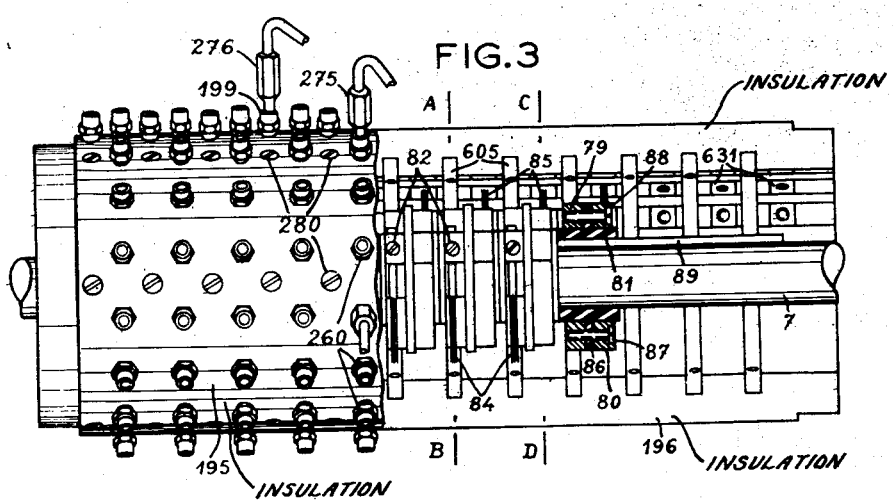
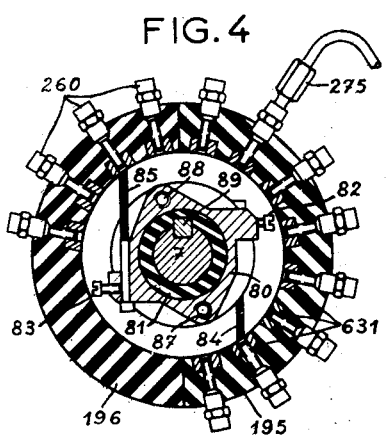 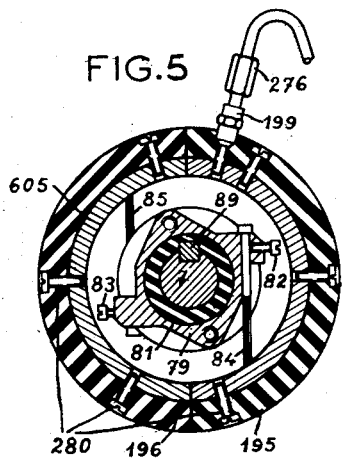
INVENTOR
K. A. Knutsen
By Watson, Cole, Grindle & Watson

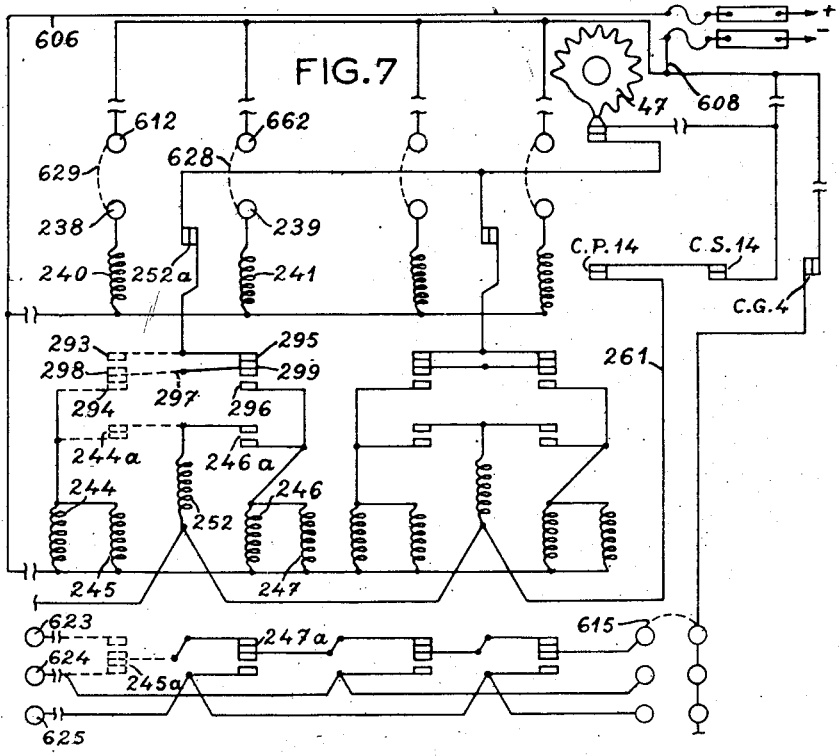
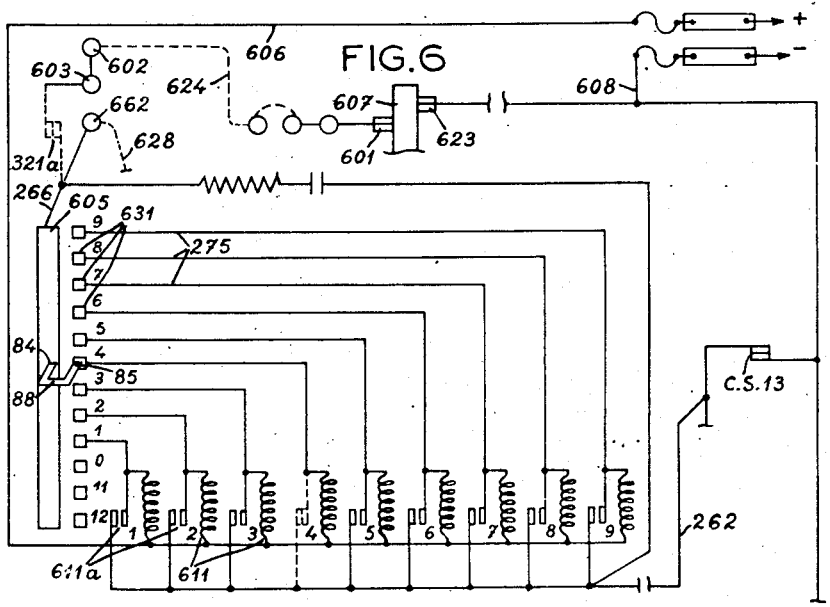

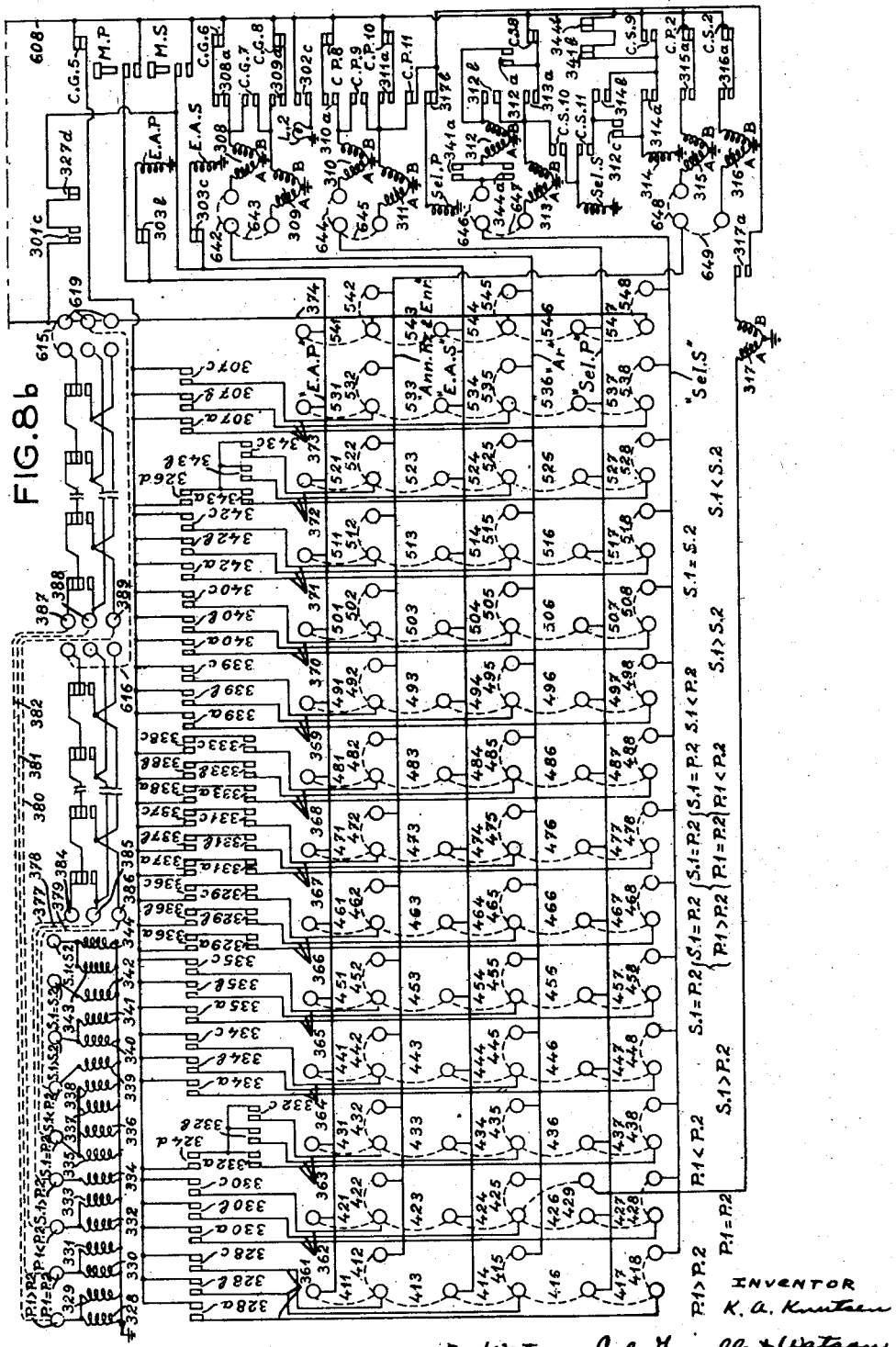

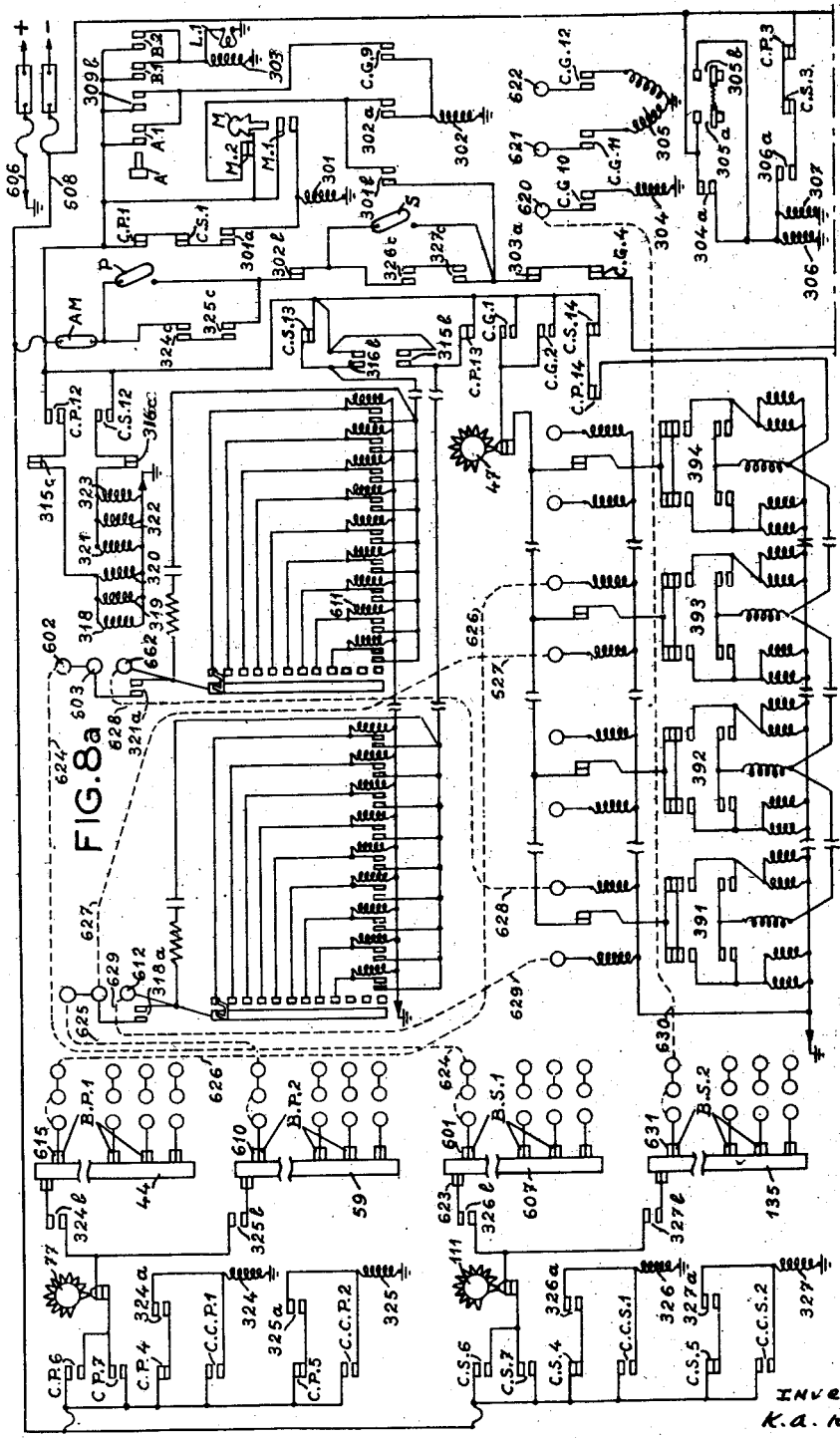

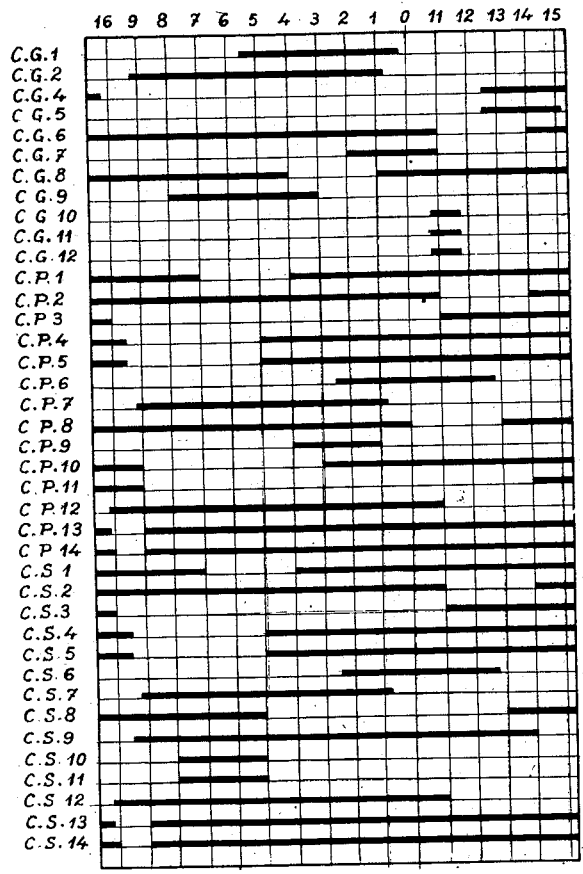

Patented Sept. 16, 1952

2,610,736

UNITED STATES PATENT OFFICE 2,610,736

MACHINE FOR COMPARING AND CLASSIFYING RECORD CARDS

Knut Andreas Knutsen, Paris, France, assignor to Compagnie des Machines Bull (Societe Anonyme), Paris, France, a French company Application December 17, 1946, Serial No. 716,796
In France February 19, 1945

Section 1, Public Law 690, August 8, 1946
Patent expires February 19, 1965

8 Claims. (Cl. 209—110)

The present invention relates to improvements in record card controlled machines and more particularly to machines for making a comparison of items located on the cards and filing of said cards according to the results of the comparison.

Such machines, wherein the items which are recorded on cards as perforations may be compared after the analysis of the perforations by an electrical device or any other suitable device, are well known. Registering or data receiving devices, permitting retention of items analyzed on the card in view of subsequent comparing operations are also well known. However, these data receiving devices as well as the data comparing devices were, in machines known heretofore, mostly mechanical in operation.

The present invention proposes to reduce the numbers of mechanical members and thus to facilitate adjustment, increase the speed and reduce the wear of the machine.

An object of the invention is to provide a registering device, or data receiving device consisting essentially of a series of electrical relays, which when energized effect an analysis of the items to be compared and close contacts, by means of which said items may be transferred to the data comparing device.

Another object of the invention is a data comparing device essentially composed of relays, the moment of energization of which determines the positioning of contacts designed to translate the results of the comparison.

A still further object of the invention is a perforated record card machine utilizing such registering and data comparing devices and adapted to file the cards in a certain sequence.

The hereinafter described mode of execution illustrated in the accompanying drawings, permits the comparison of items perforated on two groups of cards, one of which comprises cards designated as secondary cards, which are to be filed among the cards of a first group, which will be designated as primary cards. The machine is provided with two card hoppers for the primary and secondary cards respectively. From these hoppers the cards are moved along two tracks, a primary track and a secondary track, by corresponding feeding devices. The starting of one of these devices requires the energization of a primary or secondary magnet related thereto. Each track is provided with separate analyzing devices whereby the items to be compared may be entered into data receiving devices. The latter are divided into registering units which correspond each to a column of the card or to a digit to be recorded. The items analyzed on a card by a determined analyzing device are recorded, and this record is retained until the corresponding feeding device is started again, so that a new card may be analyzed by the analyzing device in question. The data receiving device is electrically connected with the data comparing device which, however, may also be controlled directly from the analyzing device; the items which are being analyzed by one of the analyzing devices, may thus be compared with the items which are being analyzed by another analyzing device or which have previously been analyzed and then recorded.

The data comparing device is divided into comparing elements each of which corresponds to a pair of columns to be compared. The result of the comparison parity of the two items or superiority of either item, is expressed by the establishment of one of three circuits. This circuit alone or in combination with other circuits established by succeeding comparisons, may cause the starting of either or both feeding devices, the ejection of the cards in a determined receptacle, and eventually the detection of an error in the card sequence or the stopping of the machine.

Further features and characteristics of the present invention will appear from the following description and the accompanying drawings which show by way of example, one mode of realization of the invention.

In the drawings:

Fig. 1 is a schematic perspective view of the driving mechanism of the machine.

Fig. 2 is a schematic longitudinal vertical section of the machine.

Fig. 3 shows a rotary commutator, some parts being omitted for the sake of comprehension.

Fig. 4 is a section of a commutator, taken on lines C—D of Fig. 3.

Fig. 5 is a section of the same commutator, taken on lines A—B of Fig. 3.

Fig. 6 is a part of the electric diagram of the machine showing a registering unit of the data receiving device.

Fig. 7 is another part of the diagram, showing two comparing elements.

Figs. 8a and 8b taken together form an electric circuit diagram of the machine.

Fig. 9 is a timing diagram for the cam contacts.

In order to facilitate an understanding of the Figs. 8a, 8b, and of the following description, the meanings of certain abbreviatia references are given hereafter:

"Ar": Machine stopping circuit.
"Ann. Rz": Cancellation of zeroizing circuit.
"Ent.": Registering or storage circuit.
"E. A. P.": Primary card feed magnet and related circuit.
"E. A. S.": Secondary card feed magnet and related circuit.
"Sel. P": Primary card selection magnet and circuit.
"Sel. S": Secondary card selection magnet and circuit.

The secondary cards are stacked in the upper or secondary hopper 355, Fig. 2, provided with a picker 357 which picks the cards one by one for each cycle at the beginning of which the magnet EAS, Fig. 1, is energized. Each card is thus pushed between the rollers of the secondary feeding device which move said card beneath the secondary brushes BS1 and BS2, Fig. 2. Likewise, the primary cards stacked in the lower or primary hopper 356, are picked up one by one by picker 358, after energization of magnet EAP, and moved by the primary feeding device beneath the primary brushes BP1 and BP2. An ejecting device common to both card tracks, which has its rollers in constant rotation, leads the cards from rollers 149 and 156, Fig. 2, towards four receptacles 101 to 104. A flap controlled by magnet Sel. P directs the primary cards to the receptacle 101 or to the receptacle 102. Likewise, the secondary cards are directed, through a flap controlled by magnet Sel. S, to either of the receptacles 103 and 104. A deflector 105 positioned by hand, makes it possible to direct into the receptacle 103, the cards which would have normally been ejected into the receptacle 102.

The drive of the machine will now be described. The motor 1, Fig. 1, drives, through a belt 6, a pulley 2 which drives the main shaft 7 through gears 4 and 5. On said shaft is fixed a gear 14 which drives the general impulse emitter 47 and the cam shaft 23 respectively through gear 22 and gears 15, 9, 8. On shaft 23 are fixed the so-called "general" cams CG1 . . . CG12 which close the corresponding contacts as shown in Fig. 9.

Each cycle of the machine corresponds to one revolution of the main shaft and comprises 16 "points," that is sixteen times the time elapsing between the passing of two consecutive perforations in front of the analyzing device.

It should be noted with reference to the Fig. 9 that the machine is stopped in a position corresponding to one of the two extreme vertical lines of the diagram.

On shaft 7, Figs. 1 and 2, are fixed the rotary parts of the commutator 16. Gear 14 drives through gears 15 and 17 a shaft 19 on which are fixed the rotated parts of two other commutators 20 and 21. The primary shaft 31 is driven by the main shaft 7 through a well known one-revolution clutch controlled by magnet EAP. Whenever magnet EAP is energized, its armature 28 releases a pawl 24, fixed on a disc 30 fixed on shaft 31, so that said pawl engages, urged by a spring 27, in a notch 26 of a disc 25 fixed on shaft 7, whereby the primary shaft performs one revolution.

The primary shaft 31 drives, through wormwheels 34 and 35, the shaft 36 which in turn, drives through gears (not shown) picker 358, Fig. 2, feed rollers 39, 49, 53, 65, 71 with their corresponding press rollers and contact rollers 44 and 59. All these parts are actuated only at such cycles hereinafter designated primary cycles, at the beginning of which magnet EAP has been energized.

Further, the primary shaft 31, Fig. 1, carries a gear wheel 75 which drives the primary impulse emitter 77 and the primary cam shaft 12, respectively through gear 76 and gears 54, 55. Shaft 12 carries cams CP1 to CP14 which close corresponding contacts as shown in Fig. 9.

A one-revolution clutch 32 of the hereabove disclosed type, controlled by magnet EAS, Fig. 1, permits the main shaft 7 to drive a secondary shaft 33 which assumes the shape of a sleeve.

This shaft 33 carries a gear 95 which, through a gear 98, drives the shaft 99 on which are fixed the secondary cams CS1 to CS14 which close corresponding contacts as shown in Fig. 9. Further, the secondary shaft 33 carries a gear 94 which through gear 96, drives shaft 97 which, in turn, through gears 106 and 107 drives shaft 108. The latter drives through gears 109, 110, the secondary impulse emitter 111. Further, shaft 108 drives, through gears (not shown) picker 357, rollers 114, 130, 124, Fig. 2, with their corresponding press rollers and contact rollers 607 and 135, all these parts constituting the secondary feeding device which is actuated only at such cycles hereinafter designated secondary cycles, at the beginning of which magnet EAS has been energized.

The main shaft 7, Fig. 1, drives further, through worm wheels 138, 139, the shaft 140 which through gears (not shown) drives the ejecting rollers 159, 156, 165, 149, 144, 172, 178, 183, 189, 194, 201, 206, 211, 216, Fig. 2, with their corresponding press rollers. Said ejecting rollers are constantly driven directly from the motor, as long as the latter is rotating.

The drive of the primary feeding device is such that a primary card picked by picker 358 during a primary cycle passes beneath brushes BP1 during a second primary cycle and beneath brushes BP2 during a third primary cycle. Then the card is moved by rollers 65 and 71 during the fourth primary cycle, at the end of which said card is seized by the ejecting roller 149 and moved independently from the energization of magnet EAP, towards the receptacles 101 or 102.

The drive of the secondary feeding device is such that a secondary card picked by picker 357 during a secondary cycle, is moved beneath brushes BS1 and BS2 during the second and third secondary cycles. At the end of the third cycle, the card will be seized by the ejecting roller 159 and moved independently from the energization of magnet EAS, towards one of the receptacles 103 or 104.

The registering or data receiving device will now be described with reference to the diagram, Fig. 6. This device comprises a certain number of registering units, each unit being susceptible of being connected to a card column in which is perforated an item to be recorded. This connection is made through a unit of the rotary commutator, whereby the brush assigned to analyze said column may be successively connected to each of the different relays constituting the registering unit. Each commutator 16, 20, 21, Fig. 1, is constituted by a certain number of commutator units, twelve in the described example. All commutators being alike, commutator 16 only will be described with reference to Figs. 3, 4 and 5.

Shaft 7, Fig. 3, carries twelve pairs of brush carriers 79, 80 insulated from the shaft and from one another, by a sleeve 81 of insulating material provided with a flange 86. To each of said brush carriers 79, 80 are fixed, by means of screws 82, 83, Figs. 4 and 5, a brush 84, 85. The two brushes of the same unit are electrically connected by screws 87, 88, Figs. 3 and 4, which extend through the flange 86 of sleeve 81. The latter is keyed to shaft 7 which causes the rotation of the brushes, performing one revolution per cycle of the machine.

Bearings 73, 74, Fig. 2, in which is rotatably mounted shaft 7, hold the two halves 195, 196, Figs. 3, 4 and 5, of a cylinder made of insulating material, the inside of which is provided with twelve circular metal strips 605, Figs. 3 and 5, fixed to the cylinder by screws 280. On each strip bears the left-hand brush 84, Fig. 3, of a commutator unit. Moreover, the inside of the cylinder is provided with twelve rows each of twelve contact segments 631, Figs. 3 and 4, regularly spaced on three quarters of the circumference and successively contacting, while the index point positions 9 to 0, 11 and 12 of a card are being analyzed, with a right hand brush 85, Fig. 3, of a commutator unit. To each strip 605 is screwed a plug socket 199 and to each segment 631 a plug socket 260. Thus for each commutator unit, during each cycle, an electric connection is successively made between each plug socket 260, Figs. 3 and 4, and the plug socket 199, Figs. 3 and 5, said electric connection being made therefore between the electric organs connected to said sockets by contact plugs 275, 276.

In Fig. 6, serving to explain the operation of the data receiving device, all that is represented beneath plug socket 602 and to the left of line 262 belongs to a registering unit, the connections to the right of plug socket 602 being considerably simplified with respect to Fig. 8a. In the electric diagrams the contacts controlled by a relay are designated by the number of said relay, followed by a letter a, b, c . . . All contacts controlled by a cam are designated by a number preceded by two letters C. G., C. P., or C. S. according to whether the cam is carried by a general, primary or secondary cam shaft. Fixed connections have been represented in full lines whereas the connections to be established by the operator have been represented in dotted lines. The contacts in operative position have also been represented in dotted lines.

Let it be assumed that an item analyzed on a secondary card by a brush 601 of the row of brushes BS1, has to be recorded in the registering unit shown in Fig. 6. To this end, brush 601 is connected to the plug socket 602 of said unit, by means of a plug connection 624. The contact segments 631 for the values 9 to 1 are connected to corresponding magnets 611 by wires 275. The contact segments for the values 0, 11 and 12 are not used in the case of a numerical registering device as herein described; they are used in the case of an alphabetical registering device. Plug socket 602 is connected through plug socket 603, closed contact 321a and wire 266, with the strip 605 of the same commutator unit.

When a determined perforation, for example a perforation 4, is analyzed by brush 601, the following circuit is established: Line 608, Fig. 6, brush 623, contact roller 607, analyzing brush 601, plug connection 624, plug sockets 602, 603, contact 321a, wire 266, contact plug 276, Figs. 3, 5 and 6, strip 605, brush 84, screw 88, Figs. 3 and 6, brush 85, contact segment 631 for the value 4, corresponding wire 275, Fig. 6, corresponding magnet 611, line 606. The energization of said magnet 611 closes the corresponding contact 611a, which closes the following holding circuit: Line 608, contact CS13, line 262, contact 611a for the value 4, magnet 611 for the value 4 and line 606. The energization of the magnet is maintained until contact CS13 is opened, at the beginning of the next secondary cycle. As long as the secondary feeding device is not started, an electric circuit is established for each cycle at the "point" 4 of said cycle, between plug socket 662 and line 608, as follows: Line 608, contact CS13, line 262, contact 611a for the value 4, corresponding wire 275, corresponding contact segment 631, brush 84, screw 88, Figs. 3 and 6, brush 85, strip 605, plug socket 662, Fig. 6. As long as no card passes beneath the brush 601 in question, an impulse is therefore received for each cycle at plug socket 662, said impulse being the same as that which would be emitted by the analysis of a perforation "4".

If magnet EAS which controls the feeding of said secondary card is energized, the card is fed, contact CS13 opens, magnet 611 for the value 4 is de-energized and the corresponding contact 611a is opened. The registering device is thus reset to zero, in condition to receive a new item perforated on the next card. Other items analyzed in different columns of the card are recorded in corresponding registering units in the same way. There are fifteen registering units for secondary cards and fifteen also for primary cards, operating in similar fashion. The diagram for a primary unit is the same as that shown in Fig. 6, except that contact CP13 must be substituted for contact CS13. A unit of each denomination has been shown in Fig. 8a.

Instead of a relay for each digit, a smaller number of relays might be used, each impulse energizing a determined combination of said relays. Instead of a single brush for each column, a number of brushes or sensing organs, one for each index point position in a column, might be utilized, thus making it possible to dispense with the commutator.

The data comparing device will now be described with reference to Fig. 7. This figure shows two comparing elements, each permitting the comparison of two digits in corresponding columns of two cards. All that is represented beneath plug sockets 612, 662 and to the left of line 261 belongs to said comparing elements, the other connections being considerably simplified and better understood by reference to Figs. 8a and 8b.

The comparison of items is effected by determining the order of succession of the timed electric impulses to which the analysis of said items gives rise, irrespective of whether this analysis be made directly from the card or subsequent to the recording in the registering device.

Each comparing element comprises two similar sections; one of these sections is connected by plug connection 629 to the plug socket 612 of a corresponding registering unit, the other is connected by plug connection 628 to the plug socket 662 of another registering unit. Each of the plug sockets 612, 662, for instance plug socket 662, is therefore connected, at a certain moment of the cycle, to line 608, either through the analyzing brush 601 and contact 321a, Fig. 6, when the associated feeding device is operated, or through a contact 611a and the commutator when said feeding device is at rest. Each section of the data comparing device comprises a relay 240, 241 which is connected at one side to plug socket 238, 239, and at the other side to the line 606. Each relay comprises an alternative set of contacts, the middle contact points of which 298, 299 are connected together by a wire 297. When magnets 240 and 241 are energized, contact points 298 and 299 make contact with the lower contact points 294 and 296 and when magnets 240 and 241 are not energized, said contact points 298 and 299 make contact with the upper contact points 293 and 295, which are both connected to line 608 through the closed contact 252a and the contact of the general impulse emitter 47. Contact points 294 and 296 are each connected, through one of the normally opened contacts 244a and 246a, to a relay 252 common to both sections of the comparing element. Further, contact points 294 and 296 are respectively connected to relays 244, 245 and 246, 247. The four relays 244 to 247 are connected to line 606 and relay 252 is connected to line 608, through cam contacts CP14 and CS14. Relays 245 and 247 each control a set of alternative contacts 245a and 247a. In the normal position of the contacts, plug socket 623 is connected to line 608 through the contacts 245a, 247a of each comparing element, plug connection 615 and cam contact CG4.

The data comparing device operates as follows. When one of the plug sockets 612, 662 is connected to line 608, as has been described hereabove for plug socket 662, the following circuit is established: Line 606, relay 240 or 241, plug socket 238 or 239, plug connection 628 or 629, plug socket 612 or 662, supply line 608. The energization of relay 240 or 241 determines the shifting of contact point 298 or 299.

It will be first assumed that the column of the primary card connected to plug socket 612, contains a perforation the value of which is higher than that of the corresponding column of the secondary card connected to plug socket 662. Therefore the circuit corresponding to plug socket 612 is closed first, and magnet 240 is energized before magnet 241. Contact point 298 is shifted as shown in dotted lines in Fig. 7, whereas contact point 299 remains in its normal position shown in full lines. The following circuit is established: Line 608, contact of the impulse emitter 47, contact 252a, contact points 295, 299, wire 297, contact points 298, 294, relays 244 and 245, line 606. The energization of relay 244 causes contact 244a to close, which insures the energization of relay 252 and the holding of the energization of relays 244, 245 and 252 through the following circuit: Line 608, contacts CS14 and CP14, relay 252, contact 244a, relays 244 and 245, line 606. The energization of relay 252 causes the opening of contact 252a. When, later in the same cycle, an impulse from the secondary card is transmitted to the data comparing device, a circuit is established, extending through line 606, relay 241, plug socket 239, plug connection 628, plug socket 662 and line 608. The contact point 299 is shifted but the opening of contact 252a, prevents the energization of relays 246, 247. At the end of the cycle, contact 245a only will be in shifted position which, when contact CG4 is closed, will establish a connection between line 608 and plug socket 624 instead of plug socket 623. The establishment of said connection indicates the result of the comparison. The energization of relays 244, 245 and 252 and the positioning of the corersponding contacts are maintained until one of the cam contacts CP14 and CS14 is opened, that is until one of the feeding devices is started. The holding circuit is then broken, all the contacts resume their normal positions and the data comparing device is reset to zero in condition to proceed to the comparison of two new items.

In the case when the item recorded on the secondary card has the higher value, relay 241 is energized first, the contact point 299 is shifted and relays 246, 247 are energized. Contact 246a maintains the energization of relays 246, 247 and 252 until one of the feeding devices is started. A subsequent energization of relays 244, 245 is prevented by the opening of contact 252a. This result is indicated by a connection between line 608 and plug socket 625.

In the case when the two compared perforations have the same value, relays 240 and 241 are energized at the same time, their middle contact points are shifted simultaneously and none of the relays 244, 245, 246, 247 can be energized. Therefore contacts 245a and 247a remain in normal position and the connection between line 608 and plug socket 623 is established at the end of the cycle. A small inaccuracy in the simultaneous shifting of both contact points 298 and 299 does not involve energization of relays 244, 245 or 246, 247, because of the impulse emitter 47 the contact times of which are substantially shorter than the contact times of the impulses transmitted to relays 240 and 241.

Thus according to whether an item contained in a card column connected to plug socket 238 is higher than, smaller than or equal to an item contained in a corresponding card column connected to plug socket 239, one of the plug sockets 624, 625 or 623 respectively will be connected to line 608 when contact CG4 closes. By connecting plug sockets 623, 624, 625 in the hereinafter described way, the result of the comparison may control the operation of the machine.

Usually it is desired to effect a comparison of the values of several digits perforated in several columns of each of two cards. In this case, the two columns for the units, the tens, the hundreds, etc., are simultaneously compared. The connection of the contacts 245a, 247a of each comparing element is so made that for the columns in which a difference is discovered, the result is determined by the column corresponding to the highest denominational order. In the example illustrated in Fig. 7, the columns for the tens should be connected to the right-hand comparing element and the columns for the units to the left-hand comparing element. It is obvious from an inspection of Fig. 7 that the positioning of the contacts 245a and 247a of the units comparing element is exploited only when there is parity for the tens, that is when the contacts 245a and 247a of the tens comparing element are both in normal position. To prevent undue exploitation of the positioning of certain contacts before all of said contacts are positioned, said exploitation is rendered dependent upon the closure of contact CG4 at the end of the cycle.

It may be observed that it is not necessary to previously record the items to be compared, as the comparison might well be effected between two consecutive cards fed by the same feeding device. Plug sockets 238, 239 would then be connected directly to the corresponding brushes of the feeding device in question.

The operation of the machine will now be described more in detail, with reference to Figs. 8a and 8b. In this diagram the connections between all relays and line 606 have not been represented for the sake of clearness of the diagram, but it is to be understood that said connections exist. All relay contacts are represented in the position which they occupy when the corresponding relays are not energized, all cam contacts being represented in the position which they occupy when the machine is at rest.

The motor having been started, the operation of the machine may be initiated by depressing key M, Fig. 8a, which energizes relay 301, through the following circuit: Line 608, contact M1, relay 301, line 606. This energization is maintained through contacts CP1, CS1 and 301a, as long as no feeding device is started. The energization of relay 301 closes contacts 301b and 301c, whereby, when contact CG4 closes, magnet EAS is energized through the following circuit: Line 608, contacts M2, 301b, 303a, CG4, 301c, Fig. 8b, 327d, closed as no card is as yet beneath brushes BS2 as will be later explained, contact 303c, magnet EAS, line 606. The energization of magnet EAS causes the coupling of the secondary card feeding device and a secondary card is fed until its foremost edge lies slightly before brushes BS1.

During its movement, the card rocks a lever which closes contact CCS1, Fig. 8a, whereby relay 326 is energized and held by contacts 326a and CS4 or by contact CCS1 as long as cards are run in the secondary feeding device.

There are three other similar card contacts CCS2, CCP1 and CCP2 which are closed slightly before a card passes beneath brushes BS2, BP1 and BP2, thereby causing the energization of the corresponding relays 327, 324 and 325.

As the contacts of the data comparing device between the primary and secondary cards, indicate a parity, a circuit is established through said data comparing device, whereby, if an appropriate plug connection has been established as later described, magnet EAP is energized. The primary feeding device is then started simultaneously with the secondary feeding device and a primary card is moved until slightly before brushes BP1.

During each secondary and primary cycle and as long as contacts 316c and 315c are closed, relay 321 or 318 is energized when the respective contact CS12 or CP12 closes.

When contacts CS1 and CP1 open, relay 301 is de-energized, contacts 301b and 301c open and magnet EAS is de-energized. Magnet EAP is also de-energized.

The depression of key M a second time, causes in the same manner the starting of the primary and secondary feeding devices. When a perforation of the secondary card passes beneath the brush 601 of the row of brushes BS1, the following circuit is established: Line 608, cam contact CS6 or CS7, contact of the secondary impulse emitter 111, contact 326b now closed, brush 623, contact roller 607, analyzing brush 601, plug connection 624, plug sockets 602, 603, contact 321a now closed, strip 605, Figs. 6 and 8a, brushes 84 and 85, contact segment 631 corresponding to the value of the perforation, corresponding magnet 611, line 606. Contact 611a maintains the energization of relay 611 and permits the recording of the analyzed item.

Simultaneously with the analysis of the perforation a comparison takes place. As the registering units connected to the primary brushes are empty, there is a secondary superiority and if a suitable plug connection has been made, as will be later described, magnet EAP is energized whereby the primary feeding device is started for the next cycle. During this cycle the first primary card passes brushes BP2 and the recording of an item, for instance in a registering unit connected to the brush 610, is effected by a circuit similar to that described for the brush 601.

If a comparing element has been connected by plug connections 628, 629 to the registering units connected to brushes 601 and 610, a comparison is effected between the item previously recorded by brush 601 and the item which is being analyzed by brush 610. According to the result of the comparison, one of the plug sockets 384, 385, 386, Fig. 8b, of this comparing element is connected, when contact CG4 closes, to line 608, through plug connection 616, one of the plug sockets 619, contact CG4, Fig. 8a, 303a, 327c, 326c, 302b, 325c, 324c. Moreover plug sockets 384, 385, 386, Fig. 8b, are connected through plug connections 377, 378, 379, respectively to plug sockets S1>P2, S1=P2 and S1<P2.

If it is desired to simultaneously compare two items perforated in a column of two consecutive primary cards, the corresponding brush 615 of the row of brushes BP1, Fig. 8a, should be connected by plug connection 626 to a section of another comparing element 393 whereas the corresponding brush 610 of the row of brushes BP2 should be connected by plug connections 625, 627 to the other section of the same element 393. No recording should be effected as the analyzed items are compared once only. The plug sockets 387, 388, 389, Fig. 8b, of the comparing element 393, Fig. 8a, are connected by plug connections 380, 381, 382, Fig. 8b, to plug sockets P1<P2, P1=P2, P1>P2.

If it is desirable to simultaneously compare two secondary cards, plug sockets S1>S2, S1=S2, S1<P2 should be connected by plug connections (not shown) to the plug sockets of the comparing elements to which the different columns to be compared are connected.

As a result to the establishment of said plug connections, when contact CG4, Fig. 8a, closes at the end of each cycle, certain of relays 328 to 344, Fig. 8b, are energized, according to the results of the comparisons effected during said cycle. Relays 328 to 344, Fig. 8b, are divided into nine groups, each group corresponding to nine possible results of comparison between two primary cards, two secondary cards or a primary card and a secondary card. The energization of one of these groups of relays causes one of the corresponding contact groups 328a, 328b ... to 343c, to close, whereby when contact CG5 closes, a connection is established between line 608 and one of the groups of lines 361 to 372.

When a primary card is compared with a secondary card, the detection of a parity between the two cards or of a superiority of the primary card or of the secondary card, results in the energization of relays 335, or 339 or 334. The closure of one of the contact groups 335a, 335b, 335c or 339a, 339b, 339c or 334a, 334b, 334c, insures, when contact CG5 closes, the establishment of a connection between line 608 and one of the groups of lines 365 or 369 or 364.

Likewise, when the comparison is to be effected between two primary cards or two secondary cards, the energization of one of relays 330, 328, 332 or 342, 343, 340 determines, by the closure of corresponding contacts, the establishment of a connection between line 608 and one of the groups of lines 362, 361, 363 or 371, 372, 370. Contact 324d which opens when no more cards pass beneath brushes BP1, is designed to prevent undue operation of the organ of exploitation corresponding to the result P1<P2, when the last primary card passes beneath brushes BP2. Contact 326d plays the same part for secondary cards.

When it is desirable to effect two simultaneous comparisons, one between two primary cards passing beneath brushes BP1 and BP2 and the other, between a primary card and a secondary card passing respectively beneath brushes BP2 and BS1, and when a parity occurs between said last named cards, the operation of different organs should be initiated according to the result of the comparison between the two primary cards. When P2=S1 and P2=P1, the energization of relays 337 and 331 by closing contacts 337a, 337b, 337c and 331a, 331b, 331c determines the establishment of a connection between line 608 and the group of lines 367. Likewise, when P2=S1 and P1>P2 or when P2=S1 and P1<P2, the energization of relays 336 and 329 or 338 and 333, determines the establishment of a connection between line 608 and the group of lines 366 or 368, through the corresponding contacts.

It may be desired to eject certain cards in a special receptacle. To this end, said cards are provided with a perforation "11" in a certain column. The analyzing brush corresponding to this column is connected by plug connection 630, Fig. 8a, to plug socket 620 as shown for a brush 631 of the row of brushes BS2. At the "point" 11 of the cycle in which the card passes beneath brushes BS2, the following circuit is established: Line 608, contact CS6, contact of the impulse emitter 111, contact 327b, contact roller 135, plug connection 630, plug socket 620, contact CG10 closed at 11, relay 304, line 606. The closure of contact 304a causes the energization of magnets 306 and 307 by the following circuit: Line 608, contact 304a, relays 306 and 307, line 606. This energization is maintained by contact 306a until the opening of cam contact CS3 or CP3, that is until one of the feeding devices is started. The energization of relay 307 causes contacts 307a, 307b, 307c, Fig. 8b, to close, whereby a connection is established between line 608 and the group of lines 373.

The same result may be obtained under the control of two perforations 11 simultaneously analyzed in two different columns of the same card or of two different cards. To this end, the analyzing brushes corresponding to these columns should be connected respectively to plug sockets 621 and 622, Fig. 8a. When said perforations 11 are analyzed and because of the closure of contacts CG11, CG12 at 11, the two coils of relay 305 are energized simultaneously and the two contacts 305a and 305b are closed at the same time, which permits the energization of relays 306 and 307, and the establishment of a connection, when contact CG5 closes, between line 608 and the group of lines 373.

For all cycles, line 374, Fig. 8b, is connected to line 608 when contact CG4 closes.

The groups of lines 361 to 374 which have just been described, may be connected, by plug connections 411 to 548 to lines "EAP," "Ann Rz & Enr," "EAS," "Ar," "Sel. P" and "Sel. S" connected themselves to hereinafter described relays, controlling various organs of exploitation of the machine. Line "EAP," Fig. 8b, is connected through the normally closed contact 303b to magnet EAP which, when contact CG5 or CG4 closes, may be energized by a circuit extending through one of the contacts 328a to 307c and the corresponding plug connection 411, 421 ... 531 or directly through line 374 and plug connection 541. The primary feeding device is thus started for the next cycle. The same result may be obtained by depressing key MP.

Likewise, magnet EAS may be energized by a circuit extending through one of the contacts 328a to 307c and a corresponding plug connection 413, 423 ... 533, or 414, 424 ... 534, or directly through line 374 and plug connection 543 or 544. The energization of magnet EAS causes the starting of the secondary feeding device for one cycle. The same result may be obtained by depressing key MS. Line "Ar" may be connected through a plug connection 642 or 643 to a double coil relay 308 or 309. If the plug connection 643 has been made, the coil 309A of the double coil relay 309 may be energized at the end of a cycle, either through one of the contacts 328a to 307c, and the corresponding plug connection 415, 425 ... 535, or directly through line 374 and plug connection 545.

The energization of coil 309A closes contact 309a, whereby the second coil 309B is energized by the following circuit: Line 608, contacts CG8, 309a, relay 309B, line 606. The energization of coil 309B is maintained until contact CG8 opens. Until then, contact 309b, Fig. 8a, remains closed, whereby, when contact CG9 closes, the following circuit is established: Line 608, contacts 309b, CG9, relay 302, line 606. The energization of relay 302 is maintained by contact 302a until contact M2 is opened by depression of key M. Once the next comparison is effected, the opening of contact 302b prevents the exploitation of this comparison, by breaking the connection between plug sockets 619, Fig. 8b, and line 608. Magnets EAP and EAS cannot therefore be energized and the machine is stopped.

The same result may be obtained, a cycle later, by the establishment of plug connection 642 instead of plug connection 643. This stop may also be caused by depression of key A, Fig. 8a; relay 302 is thus energized when contact CG9 closes.

Line "Sel. P," Fig. 8b, may be connected through a plug connection 644 or 645 to a double coil relay 310 or 311. If plug connection 645 has been made, the coil 311A of the double coil relay 311 may be energized at the end of a cycle, either through one of the contacts 328a to 307c and a corresponding plug connection 417, 427 ... 537 or direct through line 374 and plug connection 547.

The energization of coil 311A closes contact 311a, whereby the second coil 311B is energized and held until the opening of contact CP10, that is, until the beginning of the next primary cycle. If relay 317 is not energized at this time, magnet Sel. P is energized when contact CP11 closes and the primary card is directed to the receptacle 101, Fig. 2. However, if the plug connection 429, Fig. 8b, has been established and if the result recorded in the cycle concerned is P2=P1, the coil 317A of the double coil relay 317 is energized upon closure of contact CG5. The closure of contact 317a insures the energization of the second coil 317B which is held by the following circuit: Line 608, contacts CP10, 311a, CP11, 317a, coil 317B, line 606. Contact 317b is opened and the energization of magnet Sel. P is prevented.

If instead of plug connection 645, plug connection 644 is made, the energization of magnet Sel. P is delayed for one cycle. Line "Sel. S"

may be connected through a plug connection 646 or 647 to a double coil relay 312 or 313. If plug connection 647 has been made, the coil 313A of the double coil relay 313 may be energized at the end of a cycle, either through one of the contacts 328a to 307c and a corresponding plug connection 418 to 538, or direct through line 374 and plug connection 548.

The energization of coil 313A closes contact 313a, whereby the second coil 313B is energized and held until the opening of contact CS8 during the next secondary cycle. The closure of contact SC10 during this cycle determines the energization of magnet Sel. S by the following circuit: Line 608, contacts CS8, 313a, CS10, magnet Sel. S, line 606. The secondary card is thus ejected into the receptacle 104.

To eject in the receptacle 104 a group of successive secondary cards bearing the same group number, plug connection 647 is replaced by plug connection 646. As a result to the analysis of the group number of the first card of a new group, one of the contacts 341a or 344a is closed and relay 312 is energized, whereby coil 313B is energized and thus magnet Sel. S, as described. Further, relay 314 is energized and held by contacts 341b, 344b and 314a, that is, as long as successive cards bearing the same group number are moved past the secondary brushes. The energization of magnet Sel. S is thus caused for each cycle by a circuit extending through contacts CS9, 314b, CS11.

If it is desired to select detail cards bearing a given classifying datum determined by a first master card, said classifying datum is stored in a storage device during the whole operation.

For this purpose line "Ann Rz & Enr" may be connected by a plug connection 648 or 649 to a double coil relay 315 or 316. If the plug connection 648 has been made, the coil 315A of the double coil relay 315 may be energized at the end of a cycle, either through one of the contacts 328a to 307c and a corresponding plug connection 412, 422 ... 532 or direct through line 374 and plug connection 542.

The energization of coil 315A closes contact 315a, whereby the second coil 315B is energized and held until the opening of contact CP2 during the next primary cycle. The energization of relay 315 has two consequences. In the first place contact 315b, Fig. 8a, is closed, which prevents, at the beginning of the next primary cycle, the resetting to zero of the data receiving device, which resetting would have been obtained by the opening of cam contact CP13. In the second place, contact 315c is opened, relay 318 is de-energized, contact 318a is opened and the data receiving device cannot record a new primary item during the next cycle.

If plug connection 649, Fig. 8b, has been made, the same result may be obtained for the secondary data receiving device, by means of contacts 316a, b, c, and relay 321 with its contacts. If it occurs that the last card of a batch of primary cards has just passed under the sensing brushes and that secondary cards are still to be compared, the secondary card feeding mechanism will stop, as contacts 324c and 325c open upon deenergization of relays 324 and 325. By closing the switch P (Fig. 8a) shunting said contacts, and since contacts 326c and 327c are still closed due to the presence of secondary cards on the secondary card track, the machine is permitted to resume its proper operation, that is, feeding secondary cards and effecting their comparison with data stored in the primary storing device.

Likewise, if it occurs that the batch of secondary cards is exhausted before that of primary cards, the closing of switch S permits the machine to continue its operation as described.

L1 and L2 indicate the position of electric lamps arranged in a circuit to be lighted when the machine has stopped in the cases which have just been mentioned.

The hereabove description of the operation of the machine shows that the nine results of the comparison, alone or in combination, permit, due to plug conections 411 to 528 and 642 to 649, control of the seven devices corresponding to magnets EAP, EAS, Sel. P, Sel. S, 302, 315 and 316 under varying conditions, said devices being capable to be also controlled as a result to the analysis of a perforation 11 due to the establishment of plug connections 531 to 538 or for each cycle of the machine, due to the establishment of plug connections 541 to 548.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

It will be seen from the foregoing description that the machine described herein is capable of performing a number of useful operations, the more important being set forth below in summary form with reference to the electrical circuits and the connections necessary in each instance to effect a particular one of the operations.

I. Collating or merging of two batches of cards previously filed. Connections to be made: Plug connections such as 624, 625 between brushes BS1, BP2 and terminals of the storing devices such as 602 (Fig. 8a). Plug connection 616 running from terminal 619 on line 374 (Fig. 8b). Plug connections 377, 378, 379 respectively between terminals 384, 385, 386 and terminals S1=P2, S1>P2, S1<P2, so as to complete, through the alternative contacts of the comparing elements an energization circuit for one of the relays 334 to 339 inclusive, plug connections 441 to 491 inclusive to the line "EAP" and plug connections 443 to 493 inclusive to the line "EAS" for completing an energization circuit for magnets "EAP" or "EAS" in order to operate one of the two card feed mechanisms according to the result of the comparison. For actuating the primary feed mechanism for instance, said circuit may be as follows: Line 608, cam contact CG5, one set of the contacts 334a, b, c ... 339a, b, c, one group of the conductors 364 ... 369, one of the plug connections 441 ... 491, line "EAP," contact 303b, magnet "EAP," ground to line 608.

II. Verification of the filing order for a pack of cards (for instance only primary cards) with stopping of the machine in case of error.

Plug connection 626 from brush BP1 and plug connections 625, 627 from brush BP2 for completing the comparing circuits (Fig. 8a). Plug connection 615 from terminal 619 on line 374 (Fig. 8b), plug connections 380, 381, 382 respectively between terminals 387, 388, 389 and terminals P1=P2, P1>P2, P1<P2, so as to complete, through the alternative contacts of the comparing elements, an energizing circuit for one of the relays 328 ... 333 inclusive. Plug connections 421 or 431 to the line "EAP" according to the chosen order of filing for completing the energizing circuit of the magnet "EAP" as previously described and actuating the primary card feed mechanism in case of correct filing.

Plug connection 415 and 425 or 435 to the line "Ar" according to the chosen terminals representing erroneous filing, plug connection 643 between line "Ar" and the relay 309A for completing an energizing circuit of said relay and causing the stopping of the machine in the same cycle as the comparison occurs, as previously stated. For causing the stopping of the machine one cycle later, replace the plug connection 643 by plug connection 642.

III. Selecting cards bearing a special indicative hole. (In the secondary batch of cards, for instance.)

Plug connection 630 between brush BS2 and terminal 620 (Fig. 8a) for completing the analyzing circuit by the relay 304. Plug connection 546 between line 374 and line "Sel. S" (Fig. 8b), plug connection 647 between line "Sel. S" and relay 313A for immediate selection. In column 11 it was stated in which manner the energization of relay 304 (Fig. 8a) causes the contacts 381a, b, c (Fig. 8b) to be closed. The closing of these contacts permits the completion of the energizing circuit of the relay 313A, which itself causes the completion of a circuit for the magnet "Sel. S" through contacts 312a.

IV. Selecting duplicate cards, for instance from a primary batch of cards.

Plug connection 625 from brush BP1 to a comparing element 393 and plug connections 625, 627 from brush BP2 to the second terminal of the comparing element 393 (Fig. 8a), plug connection 615 from terminal 619 on line 374 (Fig. 8b), plug connections 380, 381, 382 respectively between terminals 387, 388, 389, and terminals P1=P2, P1>P2, P1<P2 for completing an energizing circuit for one of the relays 328 . . . 333 inclusive.

Plug connections 421 or 431 to line "EAP" to permit the feeding of single cards, plug connection 417 to line "Sel. P" and plug connection 645 from line "Sel. P" to relay 311A, for permitting the energization of relay "Sel. P" in a manner similar to that described in case III, and causing the selection of duplicate cards at once. For selecting duplicate cards one cycle later, plug connection 645 should be replaced by plug connection 644.

V. Selecting detail cards bearing indicative data, following a master card, on the primary track, for instance.

Plug connections as stated in case IV, and plug connection 542 from line 374 (Fig. 8b) to line "Ann. Rz et Enr." plug connection 648 from line "Ann. Rz et Enr." to relay magnet 315A.

Owing to these plug connections, it follows that, after the sensing and registering of the master card, the storing device related to the comparing element 393, cannot, neither be reset to zero nor receive other data during the following cycles on account of the closing of contact 315b and of the opening of contact 315c, as stated in column 13.

What I claim is:

1. In a cyclically operable machine for comparing and classifying records, primary and secondary record feeding devices, for feeding separate groups of primary and secondary records, primary and secondary record analyzing devices associated respectively to the said primary and secondary record feeding devices, for analyzing items recorded on successive records, primary and secondary storage means comprising each a plurality of storage relays, one storage relay for each item from 1 to 9, comparing means comprising primary and secondary comparing relays, means comprising a commutator and an electric circuit connecting said primary record analyzing device with said primary storage means for the operation during a cycle of the machine of a storage relay corresponding to an item analyzed, a branch circuit in parallel with said electric circuit for the simultaneous operation of the said primary comparing relay, means comprising said commutator for the operation of the said primary comparing relay a second time during a second cycle, means comprising a second electric circuit and a second commutator operative during said second cycle upon the analysis of an item on a secondary record for the operation of a storage means relay in the secondary storage and a second branch circuit including the said secondary comparing relay, and means for controlling the operation of the machine according to the relation between the times of energization of said primary and secondary comparing relays during said second cycle.

2. In a cyclically operable machine for comparing and classifying record cards, primary and secondary feeding devices for feeding separate groups of primary and secondary record cards, primary and secondary analyzing devices associated respectively to said primary and secondary feeding devices, for analyzing items recorded on successive record cards, storage means comprising a plurality of groups of storage relays, one group for each item from 1 to 9 and each provided with electric contacts, a commutator, circuit connections between said commutator and said primary analyzing device on one hand and said storage means on the other hand for the operation during a cycle of the machine of a storage relay corresponding to an item on a primary record card, and including holding means for said relays, comparing means comprising a pair of first comparing relays and a pair of second comparing relays, each pair consisting of a primary and a secondary relay, reading out means comprising said electric contacts and said commutator for the operation of the primary relay of said first comparing relays during a second cycle of the machine, means comprising said secondary analyzing device for the analysis of a second item on a secondary record card during said second cycle and for the operation of the secondary relay of said pair of first comparing relays, a two direction selecting contact being alternatively included in the energizing circuit of said primary second comparing relay and said secondary second comparing relay under the control of said pair of first comparing relays, according to the relation between the times of energization of said first comparing relays during said second cycle, holding means for either of said second comparing relays thus energized, and means operative according to which of said second comparing relays has been energized, to indicate the result of the comparison.

3. In a cyclically operable machine for comparing and classifying record cards, primary and secondary feeding devices for feeding separate groups of primary and secondary record cards, primary and secondary analyzing devices associated respectively to said primary and secondary feeding devices, for analyzing items recorded on successive record cards, storage means comprising a plurality of groups of storage relays, one group for each item from 1 to 9 and provided with electric contacts, a commutator, circuit connections between said commutator and said primary analyzing device on one hand and said storage means on the other hand, for the operation in a cycle of the machine of a storage relay corresponding to an item analyzed and including holding means for said relays, comparing means comprising a pair of first comparing relays and a pair of second comparing relays, each pair consisting of a primary and a secondary relay, reading out means comprising said electric contacts and said commutator for the operation of the primary relay of said first comparing relays during a second cycle of the machine, means comprising said secondary analyzing device and operative upon the analysis of a second item on a secondary record card during said second cycle, for the operation of the secondary relay of said pair of first comparing relays, a two direction selecting contact being alternatively included in the energizing circuit of said primary second comparing relay and said secondary second comparing relay under the control of said pair of first comparing relays, holding means for that one of said second comparing relays that has been energized, comprising means for breaking the connection of the other one of said second comparing relays during said second cycle and means comprising electric contacts operated by said second comparing relays and operative according to which of said second comparing relays has been energized, to indicate the result of the comparison.

4. In a machine for comparing and classifying record cards, primary and secondary feeding devices for feeding separate groups of primary and secondary record cards, primary and secondary analyzing devices associated respectively with said primary and secondary feeding devices for analyzing items recorded on successive record cards, primary and secondary storage means comprising respectively a plurality of primary and secondary storage relays arranged in groups, one group for each denominational order of said items and comprising one storage relay for each digit from 1 to 9, electric circuit connections between said primary analyzing device and a primary storage means for the operation of those of said storage relays which correspond to said item, holding circuits for said primary and secondary storage relays, reading out means for subsequently reading out an item thus accumulated, comparing means for comparing an item thus read out with an item analyzed on a secondary record card by said secondary analyzing device, means depending upon the result of the comparison for automatically starting either or both feeding devices, and means for resetting to zero of the corresponding storage means comprising primary and secondary resetting contacts controlled respectively by said primary and secondary feeding devices and included respectively in the holding circuits of said primary and secondary storage relays upon starting of one of said feeding devices.

5. In a machine for comparing and classifying record cards, primary and secondary feeding devices for feeding separate groups of primary and secondary record cards, primary and secondary analyzing devices associated respectively to said primary and secondary feeding devices for analyzing items recorded on successive record cards, primary and secondary storage means comprising respectively a plurality of primary and secondary storage relays arranged in groups, one group for each denominational order of said items and comprising one storage relay for each digit from 1 to 9, electric circuit connections including said primary analyzing device and a primary storage means for the operation of those of said relays which correspond to said item, holding circuits for said primary and secondary storage relays, reading out means for subsequently reading out an item thus stored, comparing means for comparing an item thus read out with an item analyzed on a secondary record card by said secondary analyzing device, means depending upon the result of the comparison for automatically starting either or both feeding devices and means for resetting to zero of the corresponding storage means upon starting of one of said feeding devices, said means comprising primary and secondary resetting contacts controlled respectively by said primary and secondary feeding devices and included respectively in the holding circuits of said primary and secondary storage relays, and electric contacts operated according to the result of the comparison to shunt said resetting contacts and prevent said resetting.

6. In a cyclically operable machine for comparing and classifying record cards, storage means comprising a plurality of electromagnetic storage relays each allocated to a different possible value of card item, an analyzing device for analyzing during a cycle of the machine an item recorded on a record card comprising an electrical generator producing pulses timed in the cycle of the machine and corresponding to the analyzed item, electric circuit connections for the operation by one of said pulses of one of said storage relays corresponding to an analyzed item and for holding the selected relay in operated setting, commutator means for reading out the setting of the storage relays during a second cycle of the machine by the production of a pulse timed to correspond to said setting, means for comparing said setting thus read out with a pulse resulting from the analysis in said second cycle of an item recorded on another card, said comparing means comprising a pick-up relay and a holding relay associated with said storage relay set from said first record card, a pick-up relay and a holding relay both associated with the analyzing means for said other card, said pick-up relays being energized by the item representing pulses whatever may be the relative timing of said pulses delivered under control of said storage and said analyzing means, a pair of holding contacts, each controlled by one of said holding relays, an additional relay completing through one of said holding contacts when closed a holding circuit for the corresponding holding relay, said additional relay, when energized, opening a contact included in a double controlling circuit controlled by said pick-up relays and common to both said holding relays thereby preventing the energization of one holding relay as a result of an item representing pulse when the other holding relay has been previously energized in the same comparing cycle, and electric circuit connections controlled by said holding relays for reading out the relationship between the stored item and the analyzed item.

7. In a cyclically operable machine for comparing and classifying record cards, an analyzing device for analyzing a multidenominational item recorded on a card, comprising a device for the production of a timed electrical entry pulse for each denominational order of said item, storage means comprising a plurality of groups of electric relays, each group of storage relays corresponding to one denominational order of said item, each relay in each storage group corresponding to a different timing of said entry pulse, electric circuit connections comprising a plurality of contacts each of which being under the control of one of said storage relays, a plurality of commutator elements each allocated to a group of storage relays, each of said commutator elements having corresponding electric segments being adapted to produce electric pulses timed to correspond to the said entry pulses for the reading out of the item thus stored, means for comparing, separately for each denominational order, the pulses corresponding to the item thus read out with the pulses resulting from the analysis of an item on a second card, said comparing means comprising for each denominational order of the compared items a pair of pick-up relays energized by the item representing pulses emitted by said storage means and said analyzing means, whatever may be the relative timing of said pulses, a pair of holding relays, each controlled by one of said pick-up relays, a pair of holding contacts each controlled by one of said holding relays, an additional relay completing upon operation of one of said holding contacts, a holding circuit for the corresponding holding relay, said additional relay, when energized, operating a contact inserted in a controlling circuit common to both said holding relays, said controlling circuit permitting during a comparing cycle the energization of only one of said holding relays in case of item representing pulses non-simultaneous and the energization of none of said holding relays in case of item representing pulses simultaneous, and electric circuit connections controlled by said holding relays for reading out the relationship between the timings of said item representing pulses.

8. In a machine for comparing and classifying record cards in accordance with items recorded on cards moved in succession through the machine, storage means for storing an item derived from one card, storage means for storing an item derived from another card, said storage means comprising a plurality of groups of storage relays, each group corresponding to one denominational order of the items to be compared and comprising one storage relay for each digit value from 1 to 9, a plurality of contacts each controlled by one of said storage relays, commutator means cooperating with said storage relays either for selecting the proper item representing storage relays or for reading out the previously established setting of said storage relays, comparing means for comparing an item derived from said one card and stored in the corresponding storage means upon the storing of an item derived from said other card, said comparing means comprising for each denominational order of the items to be compared, a pair of pick-up relays, electric circuit connections for feeding said pick-up relays with items representing pulses when the items to be compared are being stored in or read out from said storage means irrespective of the relative timing of said item representing pulses, a pair of holding relays each controlled by one of said pick-up relays through a controlling circuit, a pair of holding contacts each controlled by one of said holding relays, an additional relay completing, through one of said holding contacts, when closed, a holding circuit for the corresponding holding relay, said additional relay, when energized, operating a contact included in said controlling circuit common to both said holding relays, thereby preventing the momentary energization of one holding relay by an item representing pulse when the other holding relay has been previously energized during the same comparing cycle, and electric circuit connections and devices controlled by said holding relays for reading out the relationship between the items being read out and stored.

KNUT ANDREAS KNUTSEN.

REFERENCES CITED

The following references are of record in the file of this patent:

UNITED STATES PATENTS

| Number | Name | Date |
| --- | --- | --- |
| 1,030,305 | Hollerith | June 25, 1912 |
| 2,189,024 | Bryce | Feb. 6, 1940 |
| 2,379,828 | Rubidge et al. | July 3, 1945 |
| 2,388,354 | Wheeler | Nov. 6, 1945 |

FOREIGN PATENTS

| Number | Country | Date |
| --- | --- | --- |
| 880,474 | France | Jan. 4, 1943 |